(12) United States Patent
Zeng et al.

(10) Patent No.: US 9,223,019 B2
(45) Date of Patent: Dec. 29, 2015

(54) TCAS BEARING ESTIMATION WITH REDUCED ANTENNA ELEMENTS

(71) Applicant: Honeywell International Inc., Morristown, NJ (US)

(72) Inventors: Dongsong Zeng, Germanton, MD (US); Ruy C. Brandao, Redmond, WA (US); Eduard Shestak, Redmond, WA (US); Steve Pratt, St. Louis Park, MN (US); Eric Euteneuer, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 295 days.

(21) Appl. No.: 13/661,029

(22) Filed: Oct. 25, 2012

(65) Prior Publication Data

US 2014/0118181 A1     May 1, 2014

(51) Int. Cl.
   *G01S 13/93*    (2006.01)
   *G01S 13/78*    (2006.01)
   *G01S 3/48*    (2006.01)

(52) U.S. Cl.
   CPC ............... *G01S 13/9303* (2013.01); *G01S 3/48* (2013.01); *G01S 13/782* (2013.01)

(58) Field of Classification Search
   CPC . G01S 13/9303; G01S 13/782; G08G 5/0008; G08S 3/48
   USPC .......................... 342/29, 30, 357.23, 386, 455
   See application file for complete search history.

(56) References Cited

U.S. PATENT DOCUMENTS

| | | | |
|---|---|---|---|
| 4,855,748 A | | 8/1989 | Brandao et al. |
| 5,235,336 A | * | 8/1993 | Sturm et al. ..................... 342/30 |
| 5,552,788 A | * | 9/1996 | Ryan et al. ....................... 342/30 |
| 5,677,693 A | * | 10/1997 | Frankot et al. ............... 342/25 C |
| 6,169,519 B1 | | 1/2001 | Holecek et al. |
| 6,223,123 B1 | * | 4/2001 | Ryan et al. ..................... 701/521 |
| 7,583,223 B2 | * | 9/2009 | Brandao et al. ................. 342/30 |
| 2005/0156777 A1 | | 7/2005 | King et al. |
| 2008/0068250 A1 | * | 3/2008 | Brandao et al. ................. 342/30 |
| 2008/0120032 A1 | * | 5/2008 | Brandao et al. ............... 701/300 |
| 2008/0204310 A1 | | 8/2008 | Blessing et al. |
| 2008/0284637 A1 | | 11/2008 | Blessing et al. |
| 2010/0117886 A1 | * | 5/2010 | Brandao et al. ................. 342/29 |
| 2011/0267216 A1 | | 11/2011 | Smith |

FOREIGN PATENT DOCUMENTS

EP     1901087 A1     3/2008

OTHER PUBLICATIONS

U.S. Appl. No. 13/661,064, by Ruy C. Brandao, Sr. et al., filed Oct. 26, 2012.
U.S. Appl. No. 13/661,065, by Eduard Shestak, et al., filed Oct. 26, 2012.
Examination Report from Counterpart European Patent Application No. 13186784.8, dated Oct. 28, 2014, 20 pp.
Response to Examination Report dated Oct. 28, 2014, from Counterpart European Patent Application No. 13186784.8, dated Jan. 31, 2015, 10 pp.
Search Report from counterpart European Patent Application No. 13186784.8, dated Oct. 7, 2014, 3 pp.

* cited by examiner

*Primary Examiner* — John B Sotomayor
*Assistant Examiner* — Marcus Windrich
(74) *Attorney, Agent, or Firm* — Shumaker & Sieffert, P.A.

(57) ABSTRACT

Systems and methods for calculating coherent bearing that allow one to reduce the number of TCAS antenna elements. In one embodiment, the bearing calculation takes into account signal-to-noise ratio (SNR) difference experienced from top and bottom antennas mounted on a vehicle.

14 Claims, 5 Drawing Sheets

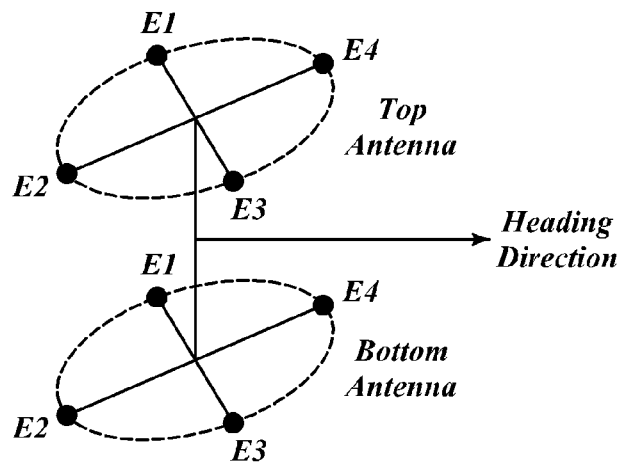
FIG.1 *(Prior Art)*
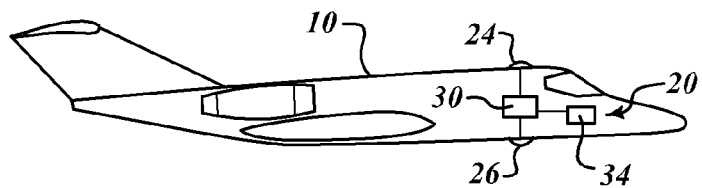
FIG.2-1
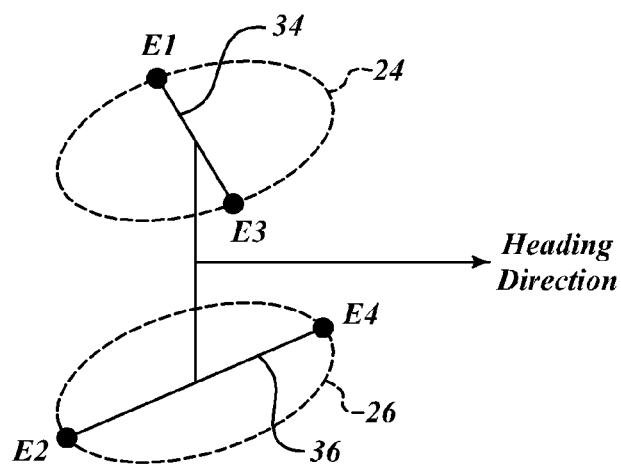
FIG.2-2

TCAS BEARING ESTIMATION WITH REDUCED ANTENNA ELEMENTS

BACKGROUND OF THE INVENTION

Traffic Collision Avoidance Systems (TCAS) use two antennas, one on the top and one on the bottom of an aircraft, each of which is used to estimate the relative beaing between own aircraft and an intruder. Each traditional TCAS antenna has four elements, which are placed orthogonally on the same plane as shown in FIG. 1. A TCAS system interrogates the transponder on other aircraft. The transponders of other aircraft respond with a reply which may contain altitude or other information. The TCAS uses the reply signal and its multi-element directional antenna to estimate the relative bearing of the other aircraft. In some systems the phase difference of the reply signal received at elements E1 and E3 is proportional to the sine function value of the intruder's bearing angle, and the phase difference between elements E2 and E4 is proportional to cosine function value of the intruder's bearing angle. (Where E1 E3 pair and the E2 E4 pair are orthogonal). The system can estimate the bearing from the signals received on one multi-element antenna. Although this is an adequate setup for determining bearing, it is redundant, costly and comes with a weight penalty because of the two antennas and eight antenna elements needed.

SUMMARY OF THE INVENTION

The present invention provides methods for calculating bearing while reducing the number of TCAS antenna elements. The bearing calculation attempts to optimally combine data from two-element antennas mounted on both top and bottom antennas.

Without shared signal data between the antennae, the traditional method of computing bearing via atan2 can result in ambiguity. In order to address this deficiency, the present invention uses the information in the SinPhase and CosPhase signals to compute the bearing using alternative algorithms.

BRIEF DESCRIPTION OF THE DRAWINGS

Preferred and alternative embodiments of the present invention are described in detail below with reference to the following drawings:

FIG. 1 illustrates a prior art antenna set-up for a vehicle;

FIG. 2-1 is a schematic diagram of an aircraft having a system formed in accordance with an embodiment of the present invention;

FIG. 2-2 illustrates an antenna set-up for the aircraft shown in FIG. 2-1;

FIGS. 3-1 and 3-2 show a flow diagram of an example process performed by the system shown in FIG. 2-1;

DETAILED DESCRIPTION OF ONE EMBODIMENT

Figures 1, 3:
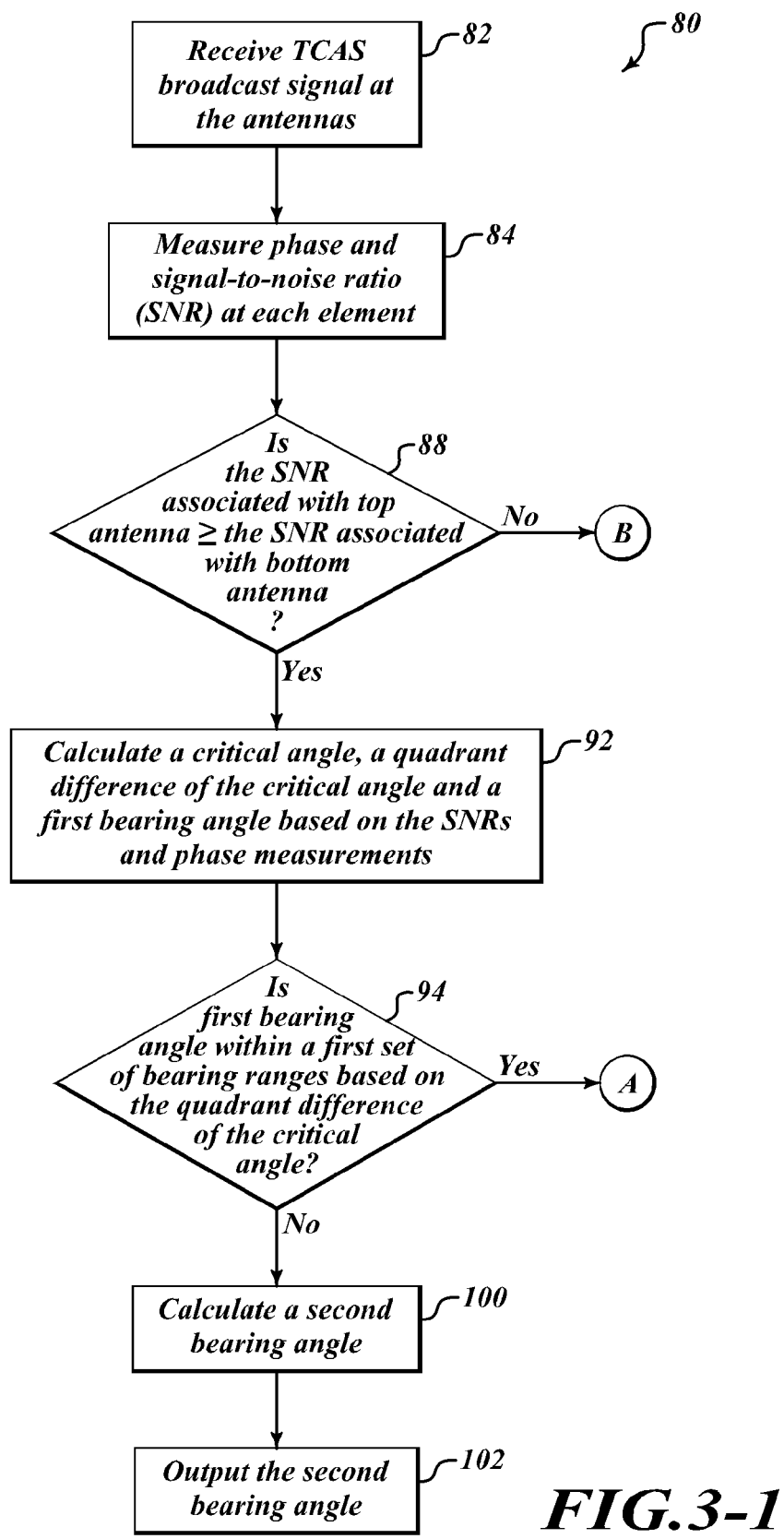
Figures 2, 3:
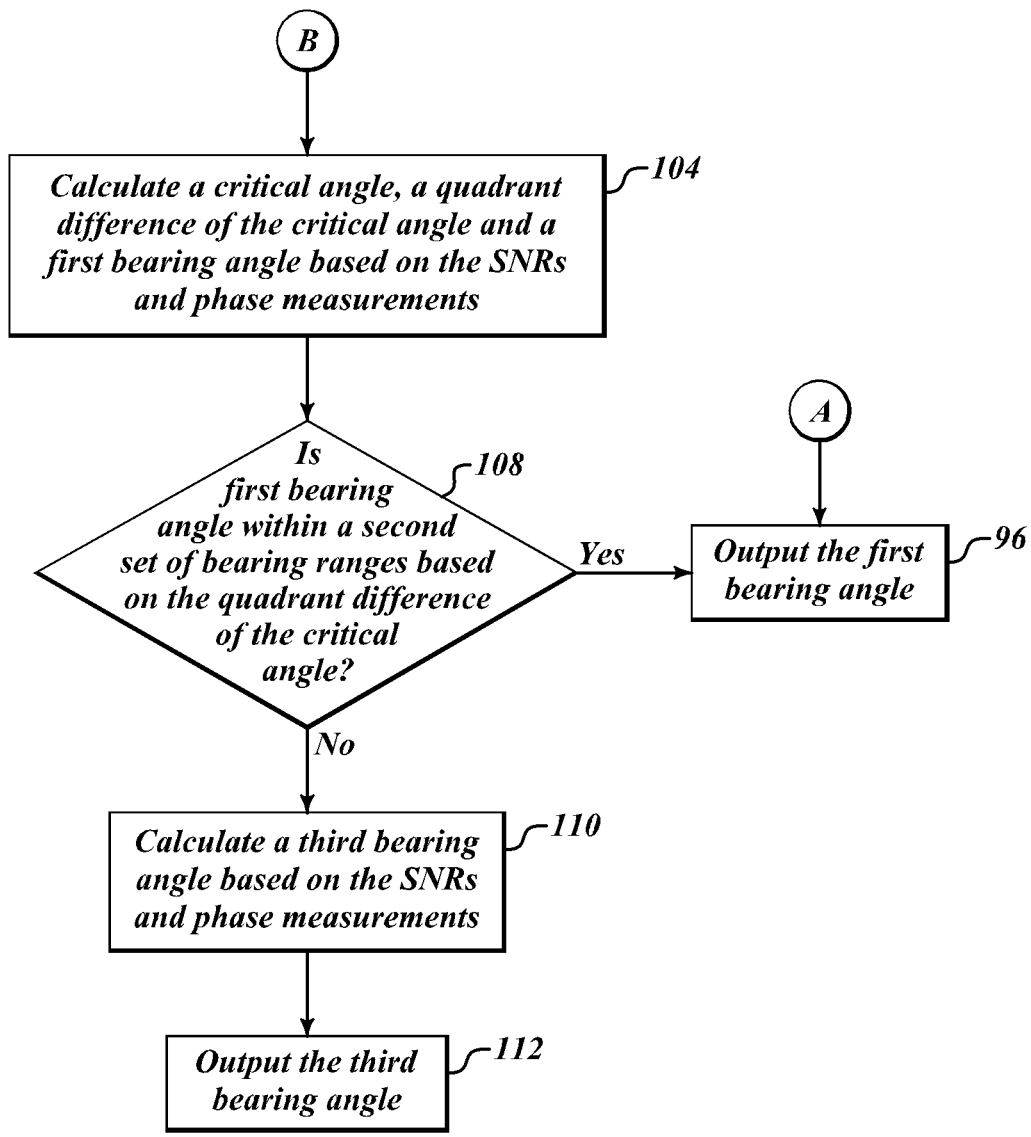

FIG. 2-1 illustrates an example aircraft 10 having a Traffic Collision Avoidance System (TCAS) 20 formed in accordance with an embodiment of the present invention. The TCAS 20 includes a first two element antenna 24 located on the top of the aircraft 10, a second two element antenna 26 on the bottom of the aircraft 10 and a TCAS processor 30 that is in signal communication with the antennae 24, 26. The processor 30 performs bearing detection based on signals received from the antennas 24, 26. The bearing value detected is sent to another device for output, such as a display device 34.

As shown in FIG. 2-2, a first axis that links the two elements E1, E3 of the first antenna 24 may be orthogonal to a second axis that links the two elements E2, E4 of the second antenna 26. The vertical axis doesn't necessarily run through aircraft center of gravity.

FIGS. 3-1, 3-2 illustrate a first example process 80 (Switching algorithm) performed by the processor 30 that uses antenna pattern and received signal strength to calculate the bearing angle. First at a block 82, a TCAS broadcast is received at the antennas 24, 26. Next at a block 84, the processor 30 receives signals from the elements of the antennas 24, 26 then measures phase and amplitude of the signal from each element. Then, signal-to-noise ratio (SNR) is estimated from the signal received by each element. Also, signal level, signal phase variance, elevation angle, etc. are estimated from the signal received by each element. However, the SNRs from the top two elements are likely similar and the same for the bottom two antenna elements. So one can make a general assumption that the signal from top two antenna elements have the same SNR, and the signal from the bottom two antenna elements have the same SNR.

At decision block 88, the processor 30 determines if the SNR associated with top antenna is greater than or equal to the SNR associated with bottom antenna. If the condition in decision block 88 is true, then at a block 92, a critical angle, a quadrant difference of the critical angle and a first bearing angle are determined based on the SNRs, phase variance, and/or phase measurements. Then at decision block 94 the processor 30 determines if the first bearing angle is within a first set of bearing ranges based on the quadrant difference of the critical angle. If the first bearing angle is within the first set of bearing ranges, the first bearing angle is outputted to an output device, at block 96. If the first bearing angle is not within the first set of bearing range, a second bearing angle is calculated, at block 100, then outputted, at a block 102.

At a block 104, if at the decision block 88, the top antenna SNR is less than the bottom antenna SNR, the action performed at block 92 is repeated, See block 104. Next at decision block 108, the processor 30 determines if the first bearing angle is within a second set of bearing ranges based on the quadrant difference of the critical angle. If the first bearing angle is within the second set of bearing ranges, the first bearing angle is outputted, at block 96. If the first bearing angle is not within the second set of bearing ranges, a third bearing angle is calculated based on the SNRs and phase measurements, at a block 110. At a block 112, the third bearing angle is outputted.

Figure 4:
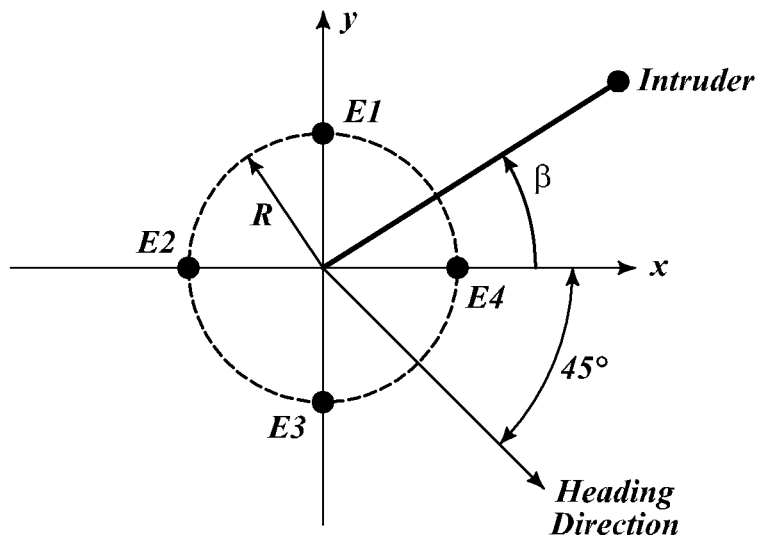
FIG. 4 is a geometric diagram illustrating the relationship of elements of the antennas used in the system shown in FIG. 2-1.
Figure 5:
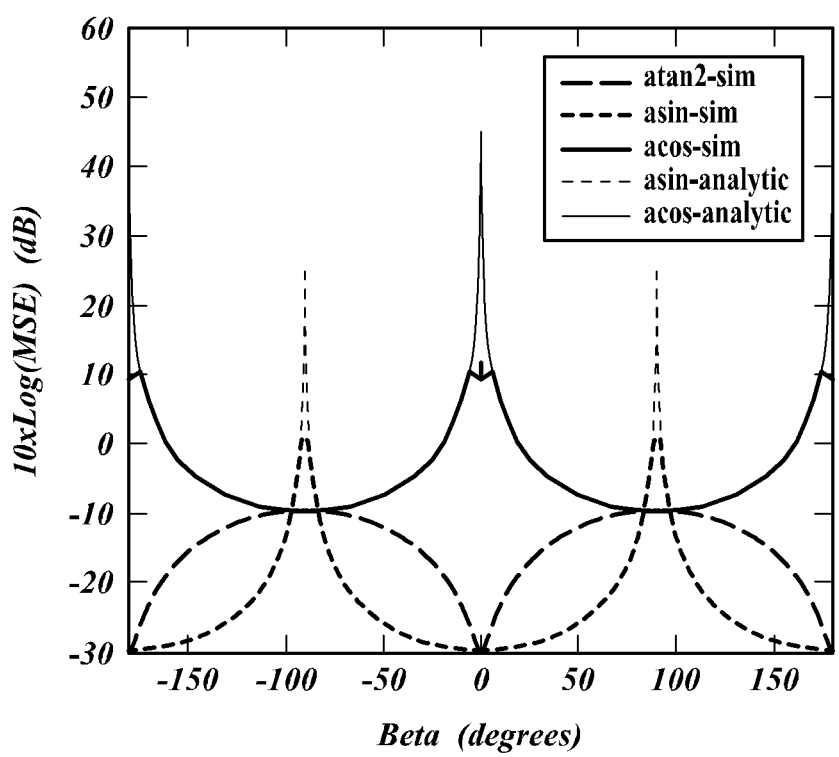
FIG. 5 is a graph illustrating optimum processing based on estimated bearing angles of a target vehicle.

FIG. 4 illustrates an example antenna configuration 120 (top down view), where R denotes the electrical phase distance from each antenna element to a center, $\beta$ is the bearing angle of an intruder vehicle. E1 and E3 are located in the top antenna 24 and E2 and E4 are in the bottom antenna 26. The SinPhase coming out of the top antenna 24 is:

$$SinPhase = \phi_1 - \phi_3 = \frac{4\pi R}{\lambda} \sin\beta \cos\alpha \qquad (1)$$

The CosPhase coming out of the bottom antenna 26 is:

$$CosPhase = \phi_4 - \phi_2 = \frac{4\pi R}{\lambda}\cos\beta\cos\alpha \quad (2)$$

where $\alpha$ is the elevation angle of the target vehicle relative to the antenna plane.

The Cramer-Rao lower bound for estimation variances of SinPhase and CosPhase are $Var_s$ and $Var_c$, respectively.

$$Var_s = \frac{1}{L\left(\frac{E_s}{N_0}\right)_s} \quad (3)$$

$$Var_c = \frac{1}{L\left(\frac{E_s}{N_0}\right)_c} \quad (4)$$

Notation $$\left(\frac{E_s}{N_0}\right)_s$$

represents the Signal-to-Noise Ratio (SNR) of SinPhase, notation $$\left(\frac{E_s}{N_0}\right)_c$$

represents the SNR of CosPhase, and L is the number of pulses which are used in the phase estimation. For illustration purpose, SINPHASE is from top antenna and COSPHASE is from bottom antenna.

$$y = \frac{SinPhase}{\frac{4\pi R}{\lambda}\cos\alpha} \text{ and } x = \frac{CosPhase}{\frac{4\pi R}{\lambda}\cos\alpha}.$$

The noisy normalized SinPhase and CosPhase outputs are $$y = \sin\beta n_s \quad (5)$$

$$x = \cos\beta n_c \quad (6)$$

The estimation variances of y and x are $\sigma_y^2$ and $\sigma_x^2$, respectively $$\sigma_y^2 = \frac{1}{L\left(\frac{E_s}{N_0}\right)_s}\left(\frac{\lambda}{4\pi R\cos\alpha}\right)^2 \quad (7)$$

$$\sigma_x^2 = \frac{1}{L\left(\frac{E_s}{N_0}\right)_c}\left(\frac{\lambda}{4\pi R\cos\alpha}\right)^2 \quad (8)$$

In order to calculate $\beta$, three possible example estimators are listed below.

$$\hat{\beta}_1 = \text{atan2}(y, x) \quad (9)$$

$$\hat{\beta}_2 = \begin{cases} \text{asin}(y), & \text{if } x \geq 0 \\ \pi - \text{asin}(y), & \text{if } x < 0 \end{cases} \quad (10)$$

$$\hat{\beta}_3 = \begin{cases} \text{acos}(x), & \text{if } y \geq 0 \\ -\text{acos}(x), & \text{if } y < 0 \end{cases} \quad (11)$$

The definitions of a tan 2(y,x), a sin (y) and a cos (x) are as follows.

$$\text{atan2}(y, x) = \begin{cases} \arctan(y, x), & x > 0 \\ \pi + \arctan(y/x), & y \geq 0, x < 0 \\ -\pi + \arctan(y/x), & y < 0, x < 0 \\ \pi/2, & y > 0, x = 0 \\ -\pi/2, & y < 0, x = 0 \\ \text{undefined}, & y = 0, x\ 0 \end{cases} \quad (12)$$

$$\text{asin}(y) = \arcsin(y) \quad (13)$$

$$\text{acos}(x) = \arccos(x) \quad (14)$$

The Maximum Likelihood Estimate (MLE) of $\beta$ is the value $\hat{\beta}$ which maximizes:

$$\log(\text{likelihood }(\hat{\beta})) = -\left(\frac{(y - \sin\hat{\beta})^2}{2\sigma_y^2} + \frac{(x - \cos\hat{\beta})^2}{2\sigma_x^2}\right) + \text{constant}$$

or, taking the derivative with respect to $\hat{\beta}$, $$\hat{\beta} \text{ solves}\left\{\frac{(y - \sin\hat{\beta})\cos\hat{\beta}}{\sigma_y^2} + \frac{(x - \cos\hat{\beta})\sin\hat{\beta}}{\sigma_x^2} = 0\right\}$$

Note: $\hat{\beta}$ depends only on $$y, x, \text{ and } \sigma_y/\sigma_x = 10^{-(RPL_y - RPL_x)/20}$$

RPL is reply or signal level in dB.

Figure 6:
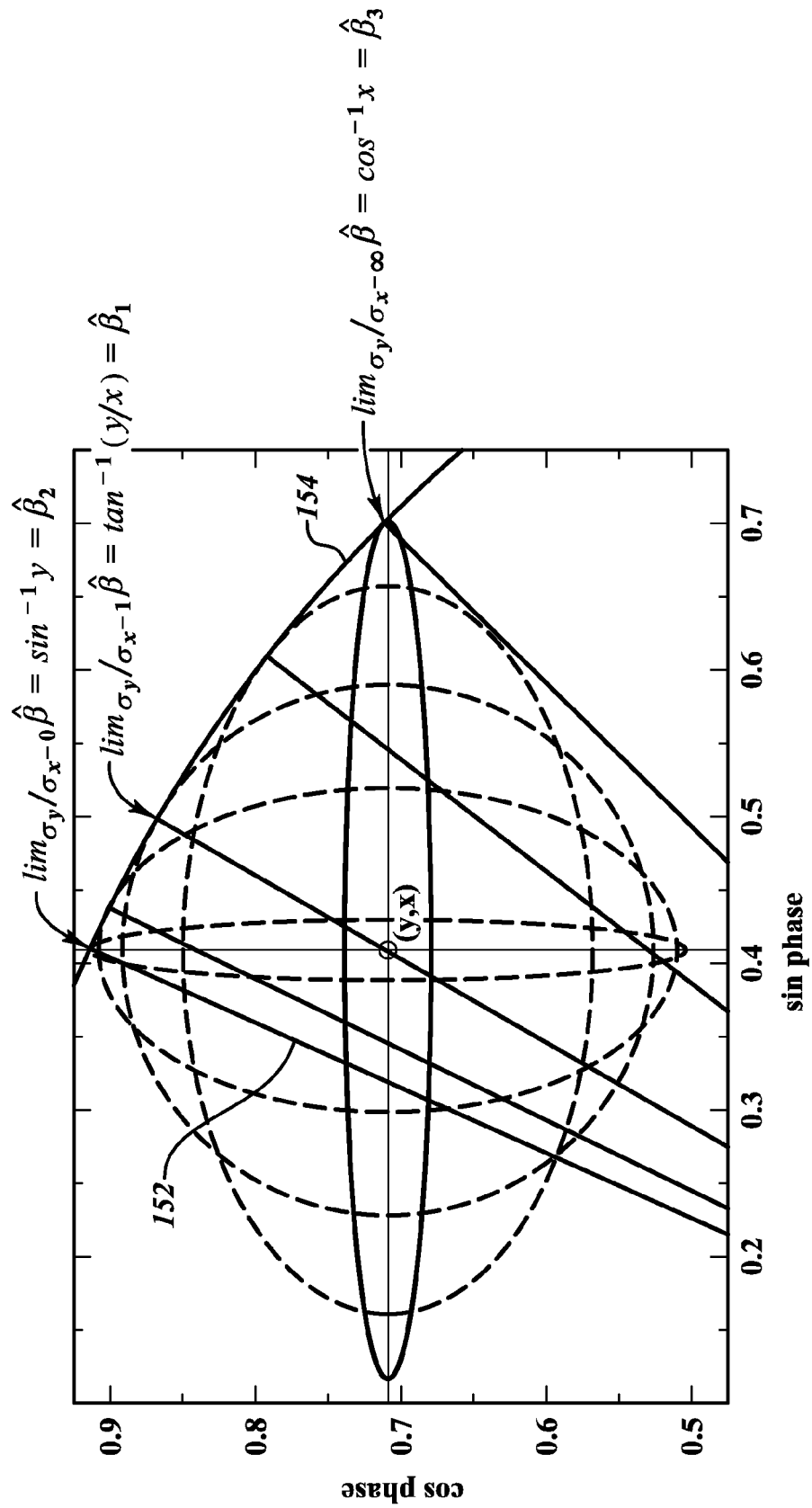
FIG. 6 illustrates a bearing estimate formed in accordance with an alternate method.

Solutions for a particular value of (y, x) are shown below for various values $\sigma_y/\sigma_x$ (which is exhibited as the aspect ratio of the ellipses 150, FIG. 6). A bearing estimate is represented by the angle of a line 152, and is determined by the point of tangency of the ellipse with the unit circle 154. For limiting cases of interest, the estimate goes to previously discussed closed form solutions, as highlighted in FIG. 6. Also, as (y, x) approaches the unit circle 154, all solutions become identical $$\left(\lim_{\sqrt{y^2+x^2}\to 1}\hat{\beta} = \hat{\beta}_1 = \hat{\beta}_2 = \hat{\beta}_3\right), \text{ independent of } \sigma_y/\sigma_x.$$

While one embodiment of the invention has been illustrated and described, as noted above, many changes can be made without departing from the spirit and scope of the invention. Accordingly, the scope of the invention is not limited by the disclosure of one embodiment. Instead, the invention should be determined entirely by reference to the claims that follow.

The embodiments of the invention in which an exclusive property or privilege is claimed are defined as follows:

1. A method comprising:
   receiving, by a processor, a broadcast signal from a target vehicle via a first antenna having only two elements and via a second antenna having only two elements, the first antenna being located on an upper surface of an own vehicle, the second antenna being located on a lower surface of the own vehicle;
   measuring, by the processor, phase and amplitude of the broadcast signal at the two elements of the first antenna and at the two elements of the second antenna;
   calculating, by the processor, a bearing angle of the target vehicle based on signal strength of the received broadcast signal and configuration of the first and second antennae; and
   outputting, by the processor, the calculated bearing angle, wherein calculating the bearing angle comprises:
      determining a first bearing angle estimate based on the phase and amplitude of the broadcast signal; and
      determining whether to use the first bearing angle estimate or to determine a second bearing angle estimate, wherein determining whether to use the first bearing angle estimate comprises:
      determining whether the first bearing angle estimate is within a first set of bearing ranges;
      in response to the first bearing angle estimate being within the first set of bearing ranges, selecting the first bearing angle estimate as the bearing angle to output; and
      in response to the first bearing angle estimate being outside the first bearing angle estimate range, determining the second bearing angle estimate and outputting the second bearing angle estimate as the calculated bearing angle.

2. The method of claim 1, wherein calculating further comprises:
   calculating a signal-to-noise ratio (SNR) of the signals from the first antenna and the second antenna; and
   calculating a signal phase variance of the signals from the first antenna and the second antenna based at least in part on the calculated SNR of the signals from both the first antenna and the second antenna,
   wherein determining the first bearing angle estimate and determining whether to use the first bearing angle estimate or to determine a second bearing angle estimate is based at least in part on the calculated signal phase variance of the signals from the first antenna and the second antenna.

3. An apparatus comprising:
   a first antenna having only two elements, the first antenna being located on a upper surface of an own vehicle, the first antenna configured to receive a Traffic Collision Avoidance System (TCAS) broadcast signal from a target vehicle;
   a second antenna having only two elements, the second antenna being located on a lower surface of the own vehicle, the second antenna configured to receive the TCAS broadcast signal from the target vehicle;
   a processor in signal communication with the first and second antennae, the processor configured to calculate bearing angle of the target vehicle based on signal strength of the received TCAS broadcast signals and configuration of the first and second antennae; and
   an output device configured to output the calculated bearing angle,
   wherein the processor is further configured to:
      measure phase and amplitude of the broadcast signal at the two elements of the first antenna and at the two elements of the second antenna;
      determine a first bearing angle estimate based on the phase and amplitude of the broadcast signal; and
      determine whether to use the first bearing angle estimate or to determine a second bearing angle estimate, wherein determining whether to use the first bearing angle estimate comprises:
      determining whether the first bearing angle estimate is within a first set of bearing ranges;
      in response to the first bearing angle estimate being within the first set of bearing ranges, selecting the first bearing angle estimate as the bearing angle to output; and
      in response to the first bearing angle estimate being outside the first bearing angle estimate range, determining the second bearing angle estimate and outputting the second bearing angle estimate as the calculated bearing angle.

4. The apparatus of claim 3, wherein the processor is further configured to:
   calculate a signal-to-noise ratio (SNR) of the signals from the first antenna and the second antenna; and
   calculate a signal phase variance of the signals from the first antenna and the second antenna based at least in part on the calculated SNR of the signals from both the first antenna and the second antenna,
   wherein determining the first bearing angle estimate and determining whether to use the first bearing angle estimate or to determine a second bearing angle estimate is based at least in part on the calculated signal phase variance of the signals from the first antenna and the second antenna.

5. The apparatus of claim 4, wherein the processor is further configured to determine the first bearing angle estimate and determine whether to use the first bearing angle estimate or to determine a second bearing angle estimate based at least in part on calculating a critical angle and a quadrant difference based on the critical angle, and to select the first bearing angle for output if the first bearing angle is within one of first and second angular ranges based on the quadrant difference, and to select the second bearing angle for output if the first bearing angle is not within one of the first and second angular ranges.

6. The apparatus of claim 5, wherein the processor further calculates a third bearing angle based on the calculated SNRs, if the SNR of the upper antenna is less than the SNR of the lower antenna.

7. The apparatus of claim 6, wherein processor further selects the first bearing angle for output, if the first bearing angle is within one of third, fourth and fifth angular ranges based on the quadrant difference and selects the third bearing angle for output, if the first bearing angle is not within one of the third, fourth and fifth angular ranges.

8. The apparatus of claim 6, wherein being configured to determine whether to use the first bearing angle estimate or to determine a second bearing angle estimate comprises being configured to perform a Maximum Likelihood Estimate (MLE) of the first bearing angle estimate.

9. The method of claim 1, wherein determining the first bearing angle estimate and determining whether to use the first bearing angle estimate or to determine a second bearing angle estimate comprises calculating a critical angle and a quadrant difference based on the critical angle.

10. The method of claim 9, wherein calculating comprises:
selecting the first bearing angle estimate for output, if the first bearing angle estimate is within one of first and second angular ranges based on the quadrant difference; and
selecting the second bearing angle for output, if the first bearing angle is not within one of the first and second angular ranges.

11. The method of claim 10, wherein calculating comprises calculating a third bearing angle based on the calculated SNRs, if the SNR of the upper antenna is less than the SNR of the lower antenna.

12. The method of claim 11, wherein calculating comprises:
selecting the first bearing angle for output, if the first bearing angle is within one of third, fourth and fifth angular ranges based on the quadrant difference; and
selecting the third bearing angle for output, if the first bearing angle is not within one of the third, fourth and fifth angular ranges.

13. The method of claim 1, further comprising determining the second bearing angle estimate, wherein determining the second bearing angle estimate comprises calculating a critical angle and a quadrant difference based on the critical angle.

14. The method of claim 1, wherein determining whether to use the first bearing angle estimate or to determine a second bearing angle estimate comprises performing a Maximum Likelihood Estimate (MLE) of the first bearing angle estimate.

\* \* \* \* \*